(12) United States Patent
Inoue et al.

(10) Patent No.: US 7,247,405 B2
(45) Date of Patent: Jul. 24, 2007

(54) NONAQUEOUS ELECTROLYTE BATTERY

(75) Inventors: Takao Inoue, Kobe (JP); Masaharu Itaya, Kobe (JP); Masahide Miyake, Kobe (JP); Masahisa Fujimoto, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 285 days.

(21) Appl. No.: 10/786,594

(22) Filed: Feb. 26, 2004

(65) Prior Publication Data

US 2004/0170902 A1   Sep. 2, 2004

(30) Foreign Application Priority Data

Feb. 28, 2003  (JP) .............................. 2003-053550
Mar. 12, 2003  (JP) .............................. 2003-067157

(51) Int. Cl.
*H01M 10/26*   (2006.01)
*H01M 4/58*   (2006.01)

(52) U.S. Cl. ................ 429/207; 429/231.6; 429/231.8; 429/218.1

(58) Field of Classification Search ................ 429/324, 429/231.6, 231.8, 218.1
See application file for complete search history.

(56) References Cited

U.S. PATENT DOCUMENTS

| | | | | |
|---|---|---|---|---|
| 3,980,495 A | * | 9/1976 | Roche et al. ................ 429/207 |
| 4,578,327 A | * | 3/1986 | Saito et al. ................ 429/231.7 |
| 5,650,244 A | * | 7/1997 | Shoji et al. ................ 429/337 |

FOREIGN PATENT DOCUMENTS

| | | |
|---|---|---|
| JP | 48-25566 | 7/1973 |
| JP | 6-163080 A | 6/1994 |
| JP | 2000-164211 A | 6/2000 |
| JP | 2002-75446 A | 3/2002 |

* cited by examiner

*Primary Examiner*—Jill Warden
*Assistant Examiner*—Thomas H. Parsons
(74) *Attorney, Agent, or Firm*—Kubovcik & Kubovcik

(57) ABSTRACT

A nonaqueous electrolyte battery which comprises a positive electrode including carbon fluoride or sulfur as an active material, a negative electrode including calcium as an active material, and an electrolyte including an imide salt of calcium or a sulfonic acid salt of calcium.

6 Claims, 3 Drawing Sheets

DISCHARGE CURVE OF CARBON FLUORIDE
(WHEN TRIFLUOROPROPYLENE CARBONATE WAS USED)

DISCHARGE CURVE OF CARBON FLUORIDE
(WHEN γ-BUTYROLACTONE WAS USED)

DISCHARGE CURVE OF SULFUR
(WHEN γ-BUTYROLACTONE WAS USED)

NONAQUEOUS ELECTROLYTE BATTERY

BACKGROUND OF THE INVENTION

1. Field of the Invention

The present invention relates to a nonaqueous electrolyte battery, and more specifically, to a nonaqueous electrolyte battery using calcium as its active material.

2. Description of the Related Art

Conventionally, in researches for secondary batteries with high energy density, nonaqueous electrolyte secondary batteries which use a nonaqueous electrolyte and make lithium ions transfer between a positive electrode and a negative electrode to achieve charge/discharge have been vigorously studied.

In recent years, as batteries to be used in portable electronic/communicative equipments such as small-sized video camera, portable phone, laptop and the like, nonaqueous electrolyte batteries represented by a lithium-ion battery are expected for practical use as batteries which are small in size and weight and enable charge/discharge with a large capacity. A commonly used lithium-ion battery uses an alloy, a carbon or silicon material capable of absorbing, storing and discharging lithium ions, or the like as a negative electrode active material, layer-shaped lithium cobalt ($LiCoO_2$), lithium transition metal complex oxides such as lithium nickel oxide ($LiNiO_2$), spinel-shaped lithium manganese oxide ($LiMn_2O_4$) as a positive electrode active material, and a solution of electrolyte comprising lithium salts such as $LiBF_4$ and $LiPF_6$ dissolved in an organic solvent such as ethylene carbonate and diethyl carbonate.

Also proposed is a battery which uses carbon fluoride as a positive electrode active material, a negative electrode formed of an alkaline metal such as lithium and sodium, and a nonaqueous electrolyte (see Japanese Patent Publication No. 48-25566).

Also proposed is a battery which uses sulfur as a positive electrode active material, a negative electrode formed of an alkaline metal such as lithium, sodium and the like, and a nonaqueous electrolyte (see Japanese Patent Publication Laid Open 2002-75446).

On the other hand, from the view point of energy density, researches are made in which alkaline earth metals such as magnesium and calcium or light metals such as aluminum are used as a negative electrode active material.

When calcium ions are used as an ion conductive medium in place of lithium ions, there arises an advantage that the number of reactive electrons is large and the cost is inexpensive.

Although batteries using such calcium ions as an active material have been suggested, any of the batteries using calcium ions as an active material that have been reported and practically used employ sulfides or oxides for a positive electrode and have a capacity of as small as 200 mAh/g or less.

Furthermore, batteries that are practically used and employ calcium ions as an active material used perchlorates such as calcium perchlorate ($Ca(ClO_4)_2$) as an electrolyte.

However, since calcium perchlorate is a salt of peroxide, and hence chemically unstable and likely to release oxygen, it is too risky to be actually used as an electrolyte. Therefore, a nonaqueous electrolyte battery using such a peroxide salt of calcium as an electrolyte could not bear practical use.

SUMMARY OF THE INVENTION

It is an object of the present invention to provide a nonaqueous electrolyte battery having a large capacity and excellent safety.

In a first aspect of the present invention, a nonaqueous electrolyte battery comprises a positive electrode including carbon fluoride as an active material, a negative electrode including calcium as an active material, and an electrolyte including an imide salt of calcium or a sulfonic acid salt of calcium.

According to such a configuration, since an imide salt of calcium or a sulfonic acid salt of calcium which is chemically stable rather than peroxides is used as an electrolyte, it is possible to provide a nonaqueous electrolyte battery having a large capacity and realizing greater safety. The nonaqueous electrolyte is preferably in the state that an imide salt of calcium or a sulfonic acid salt of calcium is dissolved in an organic solvent, however, it may be in a solid electrolyte state formed of an imide salt of calcium or a sulfonic acid salt of calcium.

The oxidation-reduction potential of calcium ion is as low as −2.866V relative to the normal hydrogen electrode (NHE) as shown below. Since 2 moles of electrons will move for oxidizing or reducing 1 mole of Ca ions, Ca ions are ionic species that are expected to give high energy density.

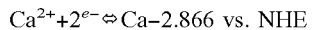

$Ca^{2+} + 2e^- \Leftrightarrow Ca -2.866$ vs. NHE

Carbon fluorides that are used as an active material will be, if $C_xF$ (x=1 to 9) are used, an active material of a positive electrode of a large capacity in which usability of the active material is high and the potential has an excellent flatness. For example, if CF (x=1) is used for a positive electrode, the battery having a large capacity of about 865 mAh/g based on a theoretical capacity density can be expected.

Also, the nonaqueous electrolyte battery of the present invention includes such a battery wherein the electrolyte includes a sulfonyl imide salt of calcium, thereby realizing a safe and a large capacity battery.

Preferably, the sulfonyl imide salt of calcium is an alkylsulfonyl imide salt of calcium.

Preferably, the alkylsulfonyl imide salt of calcium includes at least one selected from the group consisting of $Ca[N(CF_3SO_2)_2]_2$, $Ca[N(C_2F_5SO_2)_2]_2$, $Ca[(C_4F_9SO_2)(CF_3SO_2)N]_2$, $Ca[(C_6F_5SO_2)(CF_3SO_2)N]_2$, $Ca[(C_8F_{17}SO_2)(CF_3SO_2)N]_2$, $Ca[N(CF_3CH_2OSO_2)_2]_2$, $Ca[N(CF_3CF_2CH_2OSO_2)_2]_2$ and $Ca[N(CF_3)_2CHOSO_2)_2]_2$.

Furthermore, as the electrolyte, those including calcium bis(trifluoromethylsulfonyl)imide, $Ca[N(CF_3SO_2)_2]_2$ are particularly preferred.

Furthermore, as the above sulfonic acid salt, alkylsulfonic acid salts are preferred.

Furthermore, as these alkylsulfonic acid salts, those including at least one selected from the group consisting of $Ca(CF_3SO_3)_2$, $Ca(CH_3SO_3)_2$, $Ca(C_4F_9SO_3)_2$, $Ca(C_6F_5SO_3)_2$ and $Ca(C_8F_{17}SO_3)_2$ are particularly preferred.

Furthermore, as the electrolyte, those including calcium trifluoromethanesulfonate, $Ca(CF_3SO_3)_2$ are more preferred.

In this context, imide salts or sulfonic acid salts of calcium may be used solely or in combination of two or more kinds. The electrolyte is dissolved in an organic solvent in a final concentration of 0.1 to 1.5 M, preferably 0.5 to 1.5 M for use.

Test results have showed that these concentrations provide batteries with stability and a large capacity.

In a second aspect of the present invention, the nonaqueous electrolyte battery comprises a positive electrode including sulfur as an active material, a negative electrode including calcium as an active material, and a nonaqueous electrolyte including a calcium salt.

Sulfur used as an active material has a large theoretical capacity of as high as 742 mAh/g when combined with calcium, and hence high energy density can be expected.

The material constituting the positive electrode may have any composition insofar as it contains sulfur in even a small amount. However, since sulfur does not have a sufficient conductivity, for improving the charge/discharge characteristics by increasing the conductivity, it is preferred to add a conductive agent to the positive electrode. As such a conductive agent, for example, conductive carbon materials or the like can be exemplified. It is to be noted that in adding such a conductive carbon material, if the adding amount is too small, it will not be possible to satisfactorily improve the conductivity at the positive electrode. Contrarily, if the adding amount is too large, the proportion of sulfur at the positive electrode will become too small to realize a large capacity. For this reason, in using a carbon material as a conductive agent, the carbon material is added so that it occupies 5 to 84% by mass, preferably 5 to 54% by mass, more preferably 5 to 20% by mass, relative to the total content of the positive electrode.

Preferably, the calcium salt includes at least one of imide salts and sulfonic acid salts.

Since imide salts and sulfonic acid salts are more stable and less liable to release oxygen than calcium perchlorate, they are safe as an electrolyte and can provide a nonaqueous electrolyte battery having high safety and a large capacity.

Although the nonaqueous electrolyte is preferably in such a state that an imide salt of calcium or a sulfonic acid salt of calcium is dissolved in an organic solvent (electrolyte solution) or in such a state that a salt which melts at room temperature is added to the electrolyte solution, the electrolyte may be a solid electrolyte including an imide salt of calcium or a sulfonic acid salt of calcium.

In addition, the electrolyte preferably includes a sulfonyl imide salt of calcium, whereby a battery of safety and a large capacity is realized.

As the sulfonyl imide salt of calcium, alkylsulfonyl imide salts of calcium are preferred.

Preferably, the alkylsulfonyl imide salt of calcium includes at least one selected from the group consisting of $Ca[N(CF_3SO_2)_2]_2$, $Ca[N(C_2F_5SO_2)_2]_2$, $Ca[(C_4F_9SO_2)(CF_3SO_2)N]_2$, $Ca[(C_6F_5SO_2)(CF_3SO_2)N]_2$, $Ca[(C_8F_{17}SO_2)(CF_3SO_2)N]_2$, $Ca[N(CF_3CH_2OSO_2)_2]_2$, $Ca[N(CF_3CF_2CH_2OSO_2)_2]_2$ and $Ca[N(CF_3)_2CHOSO_2)_2]_2$.

Furthermore, as the electrolyte, those including calcium bis(trifluoromethylsulfonyl)imide, $Ca[N(CF_3SO_2)_2]_2$ are particularly preferred.

Furthermore, as the above sulfonic acid salt, alkylsulfonic acid salts are preferred.

Furthermore, as these alkylsulfonic acid salts, those including at least one selected from the group consisting of $Ca(CF_3SO_3)_2$, $Ca(CH_3SO_3)_2$, $Ca(C_4F_9SO_3)_2$, $Ca(C_6F_5SO_3)_2$ and $Ca(C_8F_{17}SO_3)_2$ are preferred.

Furthermore, as the electrolyte, those including calcium trifluoromethanesulfonate, $Ca(CF_3SO_3)_2$ are more preferred.

In this context, imide salts or sulfonic acid salts of calcium may be used solely or in combination of two or more kinds. The electrolyte is dissolved in an organic solvent in a final concentration of 0.1 to 1.5 M, preferably 0.5 to 1.5 M for use.

Test results have showed that these concentrations provide batteries with stability and a large capacity.

Examples of the organic solvent (nonaqueous solvent) used for the nonaqueous electrolyte include esters such as cyclic esters, cyclic carbonic acid esters and chain carbonic acid esters, cyclic ethers, chain ethers, nitriles, amides and the like. Examples of the cyclic carbonic acid esters include ethylene carbonate $((CH_2)_2O_2CO)$, propylene carbonate $(CH_3CHCH_2O_2CO)$, butylene carbonate $(CH_3CH_2CHCH_2O_2CO)$ and the like, as well as those derived by fluorinating part or whole of hydrogen of the above compounds, such as trifluoropropylene carbonate $(CF_3CHCH_2O_2CO)$. Examples of the chain carbonic acid esters include dimethyl carbonate $((CH_3O)_2CO)$, ethylmethyl carbonate $((CH_3O)(C_2H_5O)CO))$, diethyl carbonate $((C_2H_5O)_2CO)$, methylpropyl carbonate $((CH_3O)(C_3H_7O)CO)$, ethylpropyl carbonate $((C_2H_5O)(C_3H_7O) CO)$, methylisopropyl carbonate $((CH_3O)((CH_3)_2CHO)CO)$ and the like, as well as those derived by fluorinating part or whole of hydrogen of the above compounds. Examples of the esters include methyl acetate $(CH_3COOCH_3)$, ethyl acetate $(CH_3COOC_2H_5)$, propyl acetate $(CH_3COOC_3H_7)$, methyl propionate $(C_2H_5COOCH_3)$, ethyl propionate $(C_2H_5COOC_2H_5)$, γ-butyrolactone $((CH_2)_3OCO)$ and the like. Examples of the cyclic ethers include 1,3-dioxirane $((CH_2)_2O_2)$, 4-methyl-1,3-dioxirane $(CH_3CH(CH_2)_2O_2$, tetrahydrofuran $((CH_2)_4O)$, 2-methyltetrahydrofuran $(CH_3CH(CH_2)_3O)$, propylene oxide $(CH_3CHCH_2O)$, 1,2-butylene oxide $(CH_3CH_2CHCH_2O)$, 1,4-dioxane $((CH_2)_4O_2)$, 1,3,5-trioxane $((CH_2)_3O_3)$, furan $((CH)_4O)$, 2-methylfuran $((CH)_3CCH_3O)$, 1,8-cineole $(CH_3CO((CH_2)_4CH)C(CH_3)_2)$, crown ether and the like. Examples of the chain ethers include 1,2-dimethoxy ethane $((CH_3O)_2(CH_2)_2)$, diethyl ether $((C_2H_5)_2O)$, dipropyl ether $((C_3H_7)_2O)$, diisopropyl ether $(((CH_3)_2CH)_2O)$, dibutyl ether $((C_4H_9)_2O)$, dihexyl ether $((C_6H_{13})_2O)$, ethylvinyl ether $(CH_2CHOC_2H_5)$, butylvinyl ether $(CH_2CHOC_4H_9)$, methylphenyl ether $(C_6H_5OCH_3)$, ethylphenyl ether $(C_6H_5OC_2H_5)$, butylphenyl ether $(C_6H_5OC_4H_9)$, pentylphenyl ether $(C_6H_5OC_5H_{11})$, methoxytoluene $((CH_3)C_6H_4OCH_3)$, benzylethyl ether $(C_6H_5CH_2OC_2H_5)$, diphenyl ether $((C_6H_5)_2O)$, dibenzyl ether $((C_6H_5CH_2)_2O)$, o-dimethoxy benzene $(C_6H_4(OCH_3)_2)$, 1,2-diethoxy ethane $((C_2H_5O)_2(CH_2)_2)$, 1,2-dibutoxy ethane $((C_4H_9O)_2(CH_2)_2)$, diethyleneglycol dimethylether $((C_3H_7O)_2O)$, diethyleneglycol diethylether $((C_2H_5OC_2H_4)_2O)$, diethyleneglycol dibutylether $((C_4H_9OC_2H_4)_2O)$, 1,1-dimethoxyethane $((CH_3O)_2CH_2)$, 1,1-diethoxyethane $((C_2H_5O)_2CHCH_3)$, triethyleneglycol dimethylether $((CH_3)_2(C_2H_4O)_3)$, tetraethyleneglycol dimethylether $((CH_3)_2(C_2H_4O)_4)$ and the like. Examples of the nitriles include acetonitrile $(CH_3CN)$, and examples of the amides include dimethylformamide $(HCON(CH_3)_2)$ and the like. Mixed solvents of two or more kinds as recited above may be usable.

Still more, the nonaqueous electrolyte preferably includes a salt as mentioned below which melts at room temperature (also referred to as "room-temperature melting salt") having a melting point of not more than 60° C. Preferably, the room-temperature melting salt includes at least one selected from the group consisting of: trimethyl propyl ammonium bis (trifluoromethylsulfonyl) imide $((CH_3)_3N^+(C_3H_7)N^-(SO_2CF_3)_2)$, trimethyl octyl ammonium bis (trifluoromethylsulfonyl) imide $((CH_3)_3N^+(C_8H_{17})N^-(SO_2CF_3)_2)$, trimethyl allyl ammonium bis (trifluoromethylsulfonyl) imide $((CH_3)_3N^+(Allyl)N^-(SO_2CF_3)_2)$, trimethyl hexyl ammonium bis (trifluoromethylsulfonyl) imide $((CH_3)_3N^+(C_6H_{13})N^-(SO_2CF_3)_2)$, trimethyl ethyl ammonium 2,2,2-trifluoro-N-(trifluoromethylsulfonyl) acetamide $((CH_3)_3N^+(C_2H_5)(CF_3CO)N^-(SO_2CF_3))$, trimethyl allyl ammonium 2,2,2- trifluoro-N-(trifluoromethylsulfonyl) acetamide (($CH_3$)$_3$$N^+$ (Allyl)($CF_3$CO)$N^-$($SO_2$$CF_3$)), trimethyl propyl ammonium 2,2,2-trifluoro-N-(trifluoromethylsulfonyl) acetamide (($CH_3$)$_3$$N^+$($C_3$$H_7$)($CF_3$CO)$N^-$($SO_2$$CF_3$)), tetraethyl ammonium 2,2,2-trifluoro-N-(trifluoromethylsulfonyl) acetamide (($C_2$$H_5$)$_4$$N^+$($CF_3$CO)$N^-$($SO_2$$CF_3$)), triethylmethyl ammonium 2,2,2-trifluoro-N-(trifluoromethylsulfonyl) acetamide (($C_2$$H_5$)$_4$$N^+$($CH_3$)($CF_3$CO)$N^-$($SO_2$$CF_3$)), 1-ethyl-3-methylimidazolium bis (pentafluoroethylsulfonyl) imide (($C_2$$H_5$)($C_3$$H_3$$N_2$)$^+$($CH_3$)$N^-$($SO_2$)$C_2$F1-ethyl-3-methylimidazolium bis (trifluoroethylsulfonyl) imide (($C_2$$H_5$)($C_3$$H_3$$N_2$)$^+$($CH_3$)$N^-$($SO_2$$CF_3$)$_2$), 1-ethyl-3-methylimidazolium tetrafluoroborate (($C_2$$H_5$)($C_3$$H_3$$N_2$)$^+$($CH_3$)$BF_4$$^-$) and 1-ethyl-3-methylimidazolium hexafluoro phosphate (($C_2$$H_5$)($C_3$$H_3$$N_2$)$^+$($CH_3$) $PF_6$$^-$).

As the negative electrode including calcium as an active material, namely, the negative electrode capable of absorbing/discharging calcium, those including at least one of calcium metals, calcium alloys, calcium oxides, silicon, carbon and sulfides of transition metals are preferred.

DESCRIPTION OF THE PREFERRED EMBODIMENTS

Embodiments of the present invention will now be explained in detail with reference to the drawings.

First, measurement of conductivity was carried out for a nonaqueous electrolyte which was prepared by dissolving calcium bis (trifuloromethylsulfonyl) imide, Ca[N($CF_3$$SO_2$)$_2$]$_2$ in a mixed solvent (EC:DMC=50:60 (v/v)) of propylene carbonate (PC), γ-butyrolactone (γ-BL) and ethylene carbonate (EC), dimethyl carbonate (DMC). The results are shown in Table 1.

Likewise, measurement of conductivity was carried out for a nonaqueous electrolyte which was prepared by dissolving calcium trifluoromethanesulfonate, Ca($CF_3$$SO_2$)$_2$ in a mixed solvent of propylene carbonate (PC), γ-butyrolactone (γ-BL), ethylene carbonate (EC) and dimethyl carbonate (DMC)

The results are shown in Table 1.

TABLE 1

| Salt | Conductivity (mS/cm) | |
|---|---|---|
| | Ca[N($CF_3$$SO_2$)$_2$]$_2$ | Ca($CF_3$$SO_3$)$_2$ |
| PC | 2.42 | 2.15 |
| γ-BL | 6.55 | 1.0 |
| EC/DMC | 7.59 | 3.9 |

These test results show that Ca[N($CF_3$$SO_2$)$_2$]$_2$ provides higher conductivity than Ca($CF_3$$SO_2$)$_2$. Therefore, for the battery of the present invention, an imide salt of calcium is more preferable than a sulfonic acid salt of calcium.

EXAMPLE 1

1. Production of Positive Electrode

Carbon fluoride (CF) serving as an active material, carbon serving as a conductive agent, and polyvinylidene fluoride (PVDF) serving as a binder were mixed in a ratio of 90:5:5 by weight to render a mixed agent, to which N-methyl-2-pyrrolidone was added to prepare a slurry.

Then this slurry was applied on one side of aluminum foil serving as a positive electrode collector by way of doctor blade method, dried in vacuo at 110° C. and evaporated off NMP, thereby forming a positive electrode (positive electrode including carbon fluoride as an active material)

2. Production of Negative Electrode

A calcium metal plate was cut into a predetermined size so as to produce a negative electrode serving as an opposite electrode formed of calcium metal (Ca)(negative electrode including calcium as an active material).

Also a lithium metal plate was cut into a predetermined size so as to prepare a reference electrode formed of lithium metal.

3. Preparation of Nonaqueous Electrolyte

In trifluoropropylene carbonate solvent, 1 mole/L of calcium bis (trifluoromethylsulfonyl) imide, Ca[N($CF_3$$SO_2$)$_2$]$_2$ (imide salt of calcium) as an electrolyte was dissolved to prepare a nonaqueous electrolyte.

4. Production of Test Cell

Figure 1:
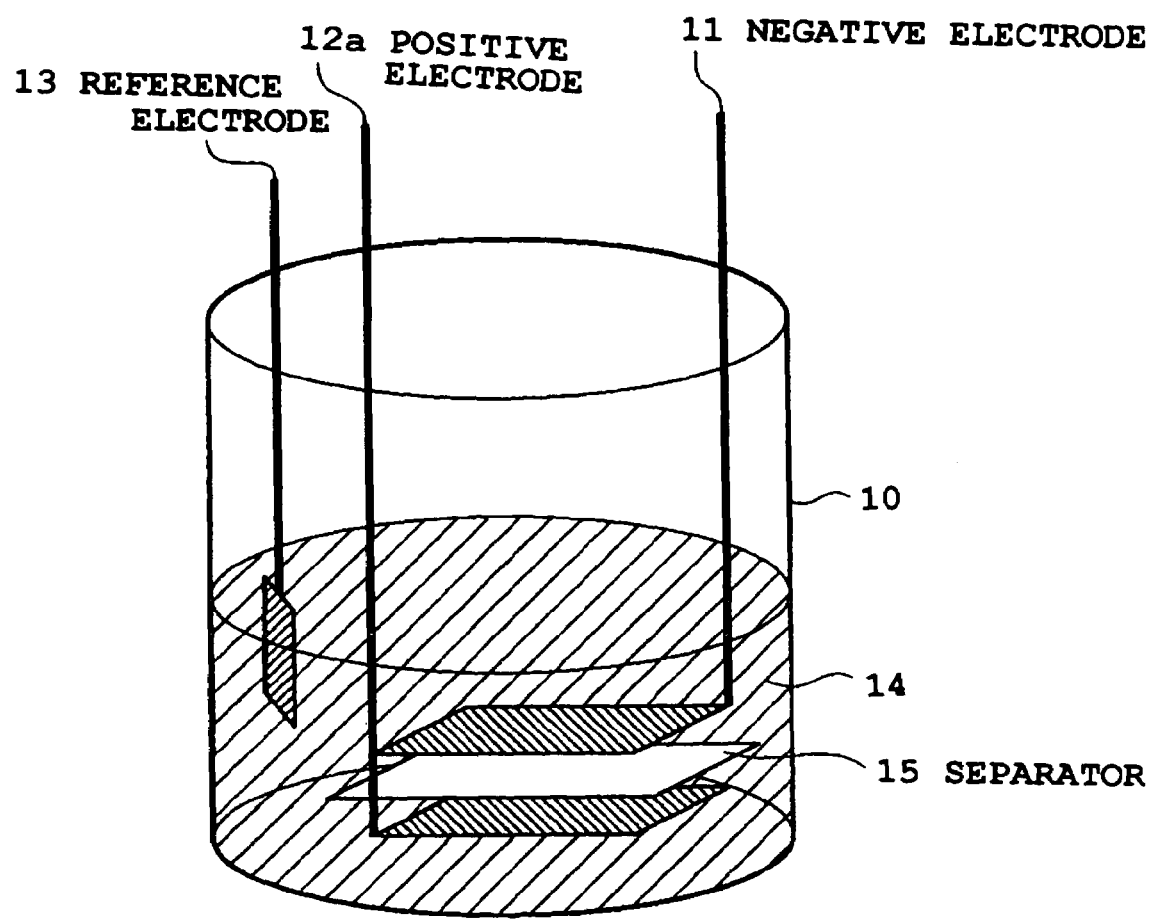
FIG. 1 is a perspective view showing a test cell of a nonaqueous electrolyte battery according to Example of the present invention.

To a test cell vessel 10 containing a positive electrode 12a serving as a working electrode which was created by attaching a lead to the positive electrode that was produced in the manner as described above; a negative electrode 11 serving as an opposite electrode which was created by attaching a lead to the negative electrode produced in the manner as described above; and a reference electrode 13 produced in the manner as described above, the aforementioned nonaqueous electrolyte 14 was poured, to thereby produce a test cell as shown in FIG. 1. The reference numeral 15 denotes a separator.

5. Test

The test cell produced in the manner as described above was subjected to constant current discharge until the electric potential of the positive electrode 12a relative to the reference electrode 13 at room temperature and at a current density of 0.025 mA/cm$^2$ became 0.3V (vs. Li/$Li^+$).

Figure 2:
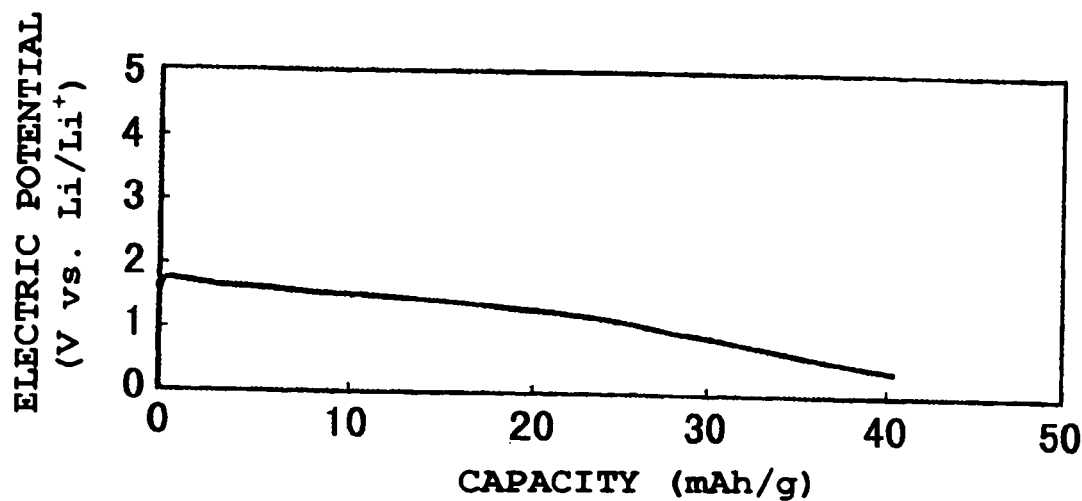
FIG. 2 is a view showing a discharge curve of a test cell of Example 1 of the present invention.

The discharge curve of this time is shown in FIG. 2. This discharge curve demonstrates that stable discharge potential is obtainable up to about 20 mAh/g.

EXAMPLE 2

In Example 2 of the present invention, a nonaqueous electrolyte was prepared in the same manner as described for Example 1 except that the nonaqueous electrolyte was prepared by dissolving 1 mole/litter of calcium bis(trifluoromethylsulfonyl) imide, Ca[N($CF_3$$SO_2$)$_2$]$_2$ as an electrolyte in γ-butyrolactone solvent in place of trifluoropropylene carbonate.

In other respects, the cell was assembled in the same manner as described for Example 1.

Figure 3:
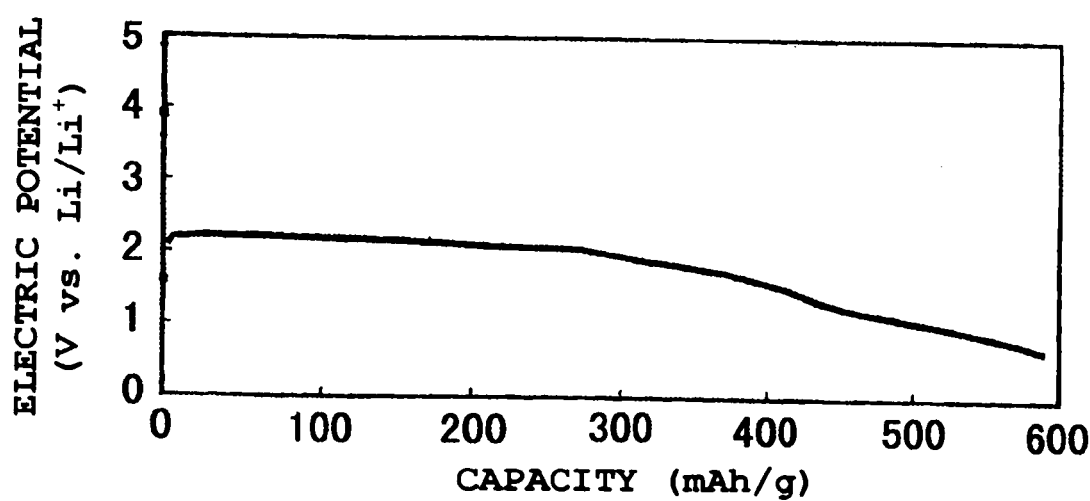
FIG. 3 is a view showing a discharge curve of a test cell of Example 2 of the present invention.

Constant current discharge was carried-out until 0.5V with respect to the electric potential of Li/$Li^+$ was reached at a current density of 0.025 mA/cm$^2$. The resultant discharge curve is shown in FIG. 3. This discharge curve demonstrates that stable discharge potential is obtainable up to about 300 mAh/g.

In the above embodiments, explanation was made for the application to a nonaqueous electrolyte battery utilizing a nonaqueous electrolyte prepared by dissolving an electrolyte in a room-temperature melting salt and an organic solvent is used as a nonaqueous electrolyte, it may be applied to a polymer battery (polymer solid electrolyte battery) using a solid electrolyte.

As described above, according to the first aspect of the invention, it becomes possible to form a nonaqueous electrolyte battery with safety and a large capacity by using an electrolyte based on imide or sulfonic acid.

EXAMPLE 3

1. Production of Positive Electrode

50% by mass of sulfur (S) serving as an active material, 45% by mass of Ketjen Black serving as a conductive agent, 4% by mass of styrene-butadiene rubber a binder and 1% by mass of carboxy-methyl-cellulose as a thickener were mixed to render a mixed agent, to which water was added to prepare a slurry.

Then this slurry was applied on one side of aluminum foil serving as a positive electrode collector by way of doctor blade method, dried in vacuo at 50° C. and evaporated off water, thereby forming a positive electrode (positive electrode including sulfur as an active material).

2. Production of negative electrode

A calcium metal plate was cut into a predetermined size so as to produce a negative electrode serving as an opposite electrode formed of calcium metal (Ca)(negative electrode including calcium as an active material).

Also a lithium metal plate was cut into a predetermined size so as to prepare a reference electrode formed of lithium metal.

3. Preparation of Nonaqueous Electrolyte

In γ-butyrolactone (($CH_2$)$_3$OCO), calcium bis (trifluoromethylsulfonyl) imide, Ca[N($CF_3SO_2$)$_2$]$_2$ was dissolved in a concentration of 1 mol/L to prepare a nonaqueous electrolyte.

4. Production of Test Cell

To a test cell vessel 10 containing a positive electrode 12a serving as a working electrode which was created by attaching a lead to the positive electrode that was produced in the manner as described above; a negative electrode 11 serving as an opposite electrode which was created by attaching a lead to the negative electrode produced in the manner as described above; and a reference electrode 13 which was created by attaching a lead to the lithium metal produced in the manner as described above, the aforementioned nonaqueous electrolyte 14 was poured, to thereby produce a test cell as shown in FIG. 1. The reference numeral 15 denotes a separator.

5. Test

The test cell produced in the manner as described above was subjected to constant current discharge until 0 V (vs. Li/Li$^+$) was reached at room temperature and at a current density of 0.025 mA/cm$^2$.

Figure 4:
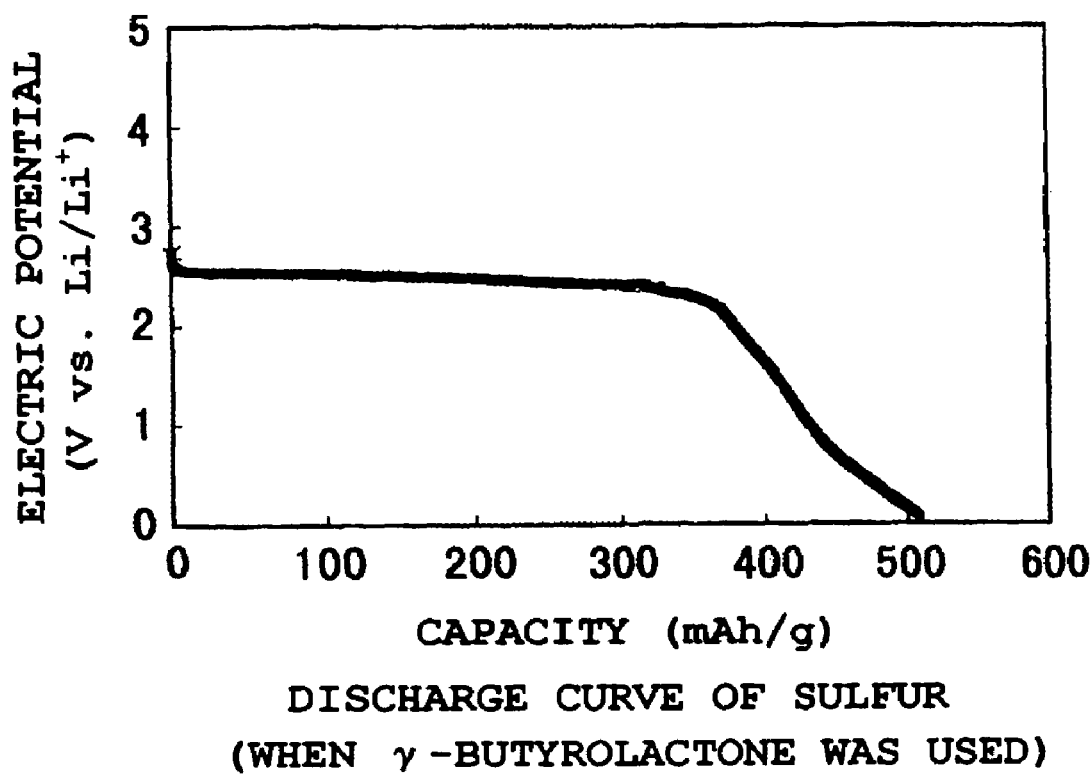
FIG. 4 is a view showing a discharge curve of a test cell of Example 3 of the present invention.

The discharge curve of this time is shown in FIG. 4. This discharge curve demonstrates that sulfur has a discharge capacity of as large as 500 mAh/g.

In the above embodiments, explanation was made for the application to a nonaqueous electrolyte battery utilizing a nonaqueous electrolyte prepared by dissolving an electrolyte in an organic solvent is used as a nonaqueous electrolyte, it may be applied to a polymer battery (polymer solid electrolyte battery) using a solid electrolyte.

As described above, according to the second aspect of the present invention, by using sulfur as a positive electrode active material, it becomes possible to form a nonaqueous electrolyte battery with safety and a large capacity using calcium as an ion conductive medium.

What is claimed is:

1. A nonaqueous electrolyte battery comprising a positive electrode including sulfur as an active material, a negative electrode including calcium as an active material, and an electrolyte including a calcium salt,
   wherein the calcium salt includes at least one of an imide salt and sulfonic acid salt.

2. The nonaqueous electrolyte battery according to claim 1, wherein the imide salt is an alkylsulfonyl imide salt.

3. The nonaqueous electrolyte battery according to claim 2, wherein the alkylsulfonyl imide salt is calcium bis (trifluoromethylsulfonyl) imide, Ca[N($CF_3SO_2$)$_2$]$_2$.

4. The nonaqueous electrolyte battery according to claim 1, wherein the sulfonic acid salt is an alkylsulfonic acid salt.

5. The nonaqueous electrolyte battery according to claim 4, wherein the alkylsulfonic acid salt is calcium trifluoromethanesulfonate, Ca ($CF_3SO_3$)$_2$.

6. The nonaqueous electrolyte battery according to claim 1, wherein the negative electrode includes at least one of calcium metals, calcium alloys, calcium oxides, silicon, carbon and sulfides of transition metals.

* * * * *